June 12, 1951 W. H. WOLOWITZ 2,557,022

METHOD OF PREPARING RECORD CARDS WITH CONDUCTIVE MARKS

Filed Oct. 31, 1949

INVENTOR

WILLIAM H. WOLOWITZ

BY H. G. Lombard

ATTORNEY

Patented June 12, 1951

2,557,022

UNITED STATES PATENT OFFICE 2,557,022

METHOD OF PREPARING RECORD CARDS WITH CONDUCTIVE MARKS

William H. Wolowitz, Washington, D. C.

Application October 31, 1949, Serial No. 124,713

9 Claims. (Cl. 235—61.12)

This invention relates in general to record cards and sheets which are provided with electrically conductive sensing marks for controlling the operation of statistical machines and is directed to an improved method for providing such conductive marks upon the surface of a record card or sheet.

The invention deals, more particularly, with improvements in the preparation of record cards and sheets of this character which are provided in quantity with preformed conductive marks or spots at selected locations for predetermined applications and uses.

In the provision of sensing marks with conducting graphite in the form of ink, such marks frequently are not uniform in their conductivity and, therefore, when sensed by contacting brushes or wipers are unreliable as current conductors between such wipers. One of the principal reasons for this insufficiency resides in the fact that the oil or other fluid that is mixed with the graphite to provide any such ink necessarily detracts from the effectiveness of the graphite and otherwise increases the resistance of the colloidal graphite to electrical conductivity which causes unreliable sensing operations, as aforesaid. Moreover, in the handling of tabulating cards in which ink is used to form the conductive marks, the ink, even when supposed to be dry, usually has a decided tendency to smear or smudge beyond the specific area of a sensing mark onto an adjoining area and thus cause inaccurate and undesired sensing operations.

A primary object of this invention, therefore, is to provide an improved method for providing a more reliable and effective sensing mark on a record card or sheet wherein the sensing mark comprises a layer of substantially pure graphite or other conductive material which is unmixed with any other substance such that the sensing mark is capable of maximum electrical conductivity.

A further object of the invention is to provide such a method and record card or sheet in which the sensing marks are made of powdered graphite, or the like, adhesively united to the record card or sheet in a manner whereby the marks are precise, well defined and of uniform consistency so that accurate sensing operations and uniform conductivity of said sensing marks is insured.

Another object of the invention is to provide a method for forming sensing marks on a record card or sheet, as aforesaid, together with a protective coating for the sensing marks which prevents any smudge or smear thereof that might cause an inaccurate sensing operation.

A more specific object of the invention is for the provision of such a method and a record card or sheet provided with conducting sensing marks together with a protective coating wherein the protective coating is provided by means of sprayed plastic material.

Further objects and advantages and other new and useful features in the invention will be readily apparent as the following description proceeds with reference to the accompanying drawings, for purposes of illustration but not of limitation, in which like reference characters designate like parts throughout, and in which:

Fig. 3 illustrates the second step in the method in which powdered graphite is applied over the previously applied adhesive; and, Fig. 4 shows the third step in the method wherein the conductive sensing mark is provided with a protective coating of sprayed plastic.

Figure 1:
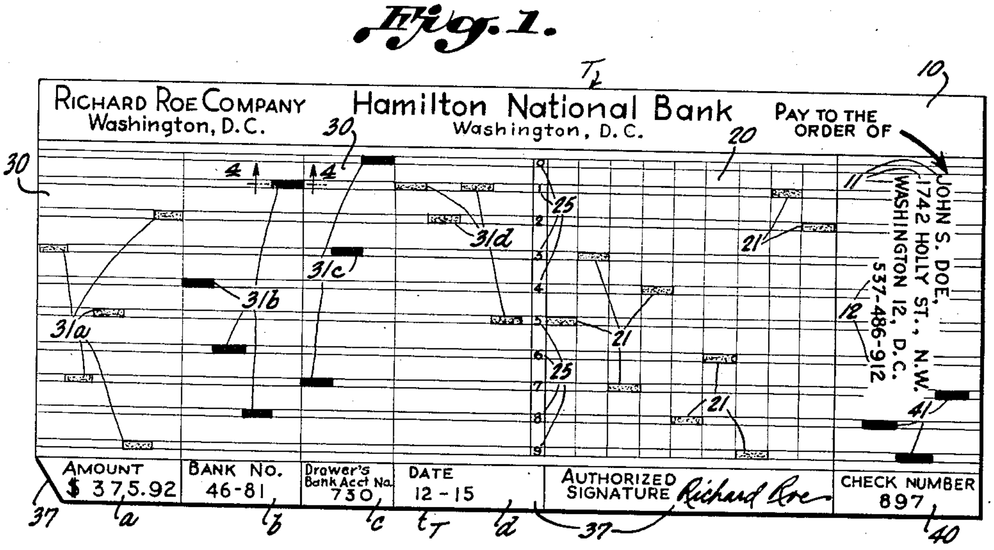
Fig. 1 is a plan view of a record card or sheet in the form of a bank check provided with sensing marks by way of an example of a typical application of the invention.

Fig. 1 illustrates a typical application of the invention in which conductive sensing marks indicating the details of a transaction are provided on a tabulating card T in the form of a bank check according to the system disclosed in prior copending application Serial Number 111,902, filed August 23, 1949, and since issued as U. S. Patent No. 2,520,077, dated August 22, 1950.

In accordance with the same general system, tabulating cards may be suitably provided with sensing marks for recording the details of any sale or other business transaction. In many instances, the tabulating cards are uniform as respects the sensing marks indicating the constant or source data of the transaction and, accordingly, considerable savings are involved in providing the tabulating cards with preformed sensing marks indicating such constant or source data so that at the time of a transaction, only the sensing marks indicating the variable details of the transaction need be provided on the tabulating card.

In the case of a bank check, for example, the conductive sensing marks indicating the bank number and drawer's account number are advantageously preformed on the tabulating card together with those sensing marks indicating the number of the check. The check, accordingly, may be quickly completed for a transaction at any subsequent time merely by providing the sensing marks representing the required variable data such as the payee, amount and date of the check.

In the example of a bank check T, shown in Fig. 1, the upper area 10 is provided with printed characters and sensing marks reproduced from a printing identification plate as disclosed in the aforesaid prior application. Such a printing identification plate is adapted to reproduce the printed characters 11 disclosing the name and address of the payee together with an account number 12 assigned to such payee, as in the case of an employee of a company, for example. In a similar manner, there may be identified any other payee such as a creditor to whom checks are frequently forwarded in payment of periodic bills for goods or services rendered.

In the area 20, there are simultaneously printed the sensing marks 21 representing said account number 12. These sensing marks are provided in the area 20 at predetermined locations according to a code or table based on the order and value of each numeral or digit in the account number 12. In the present example, the account number 12 comprises nine digits and accordingly, the sensing marks 21 are shown reproduced in nine transverse columns in said area 20.

In each of such transverse columns, a sensing mark 21 representing a number or digit from 0 to 9, inclusive, is provided in a specific predetermined transverse location depending on the value of such numeral or digit. Preferably a column of similarly spaced identifying numerals 25 is also printed on the card so that the sensing marks 21 may be easily read for verifying the same against the account number 12.

It will be understood, accordingly, that in the example of an account number 12, the first digit 5 thereof has its corresponding sensing mark 21 formed in the first transverse column in the area 20 and in the predetermined transverse position for the value five as indicated by such identifying numeral 25. The second numeral or digit of the account number 12 is a 3 and the sensing mark 21 for this digit is found in the second or next adjacent transverse column in the predetermined transverse position for the value three as indicated by such identifying numeral 25. Likewise, the third numeral or digit of the account number is a 7 and the sensing mark 21 is located in the third transverse column in the area 20 and in the predetermined transverse position for the value seven as indicated by such identifying numeral 25.

In a similar manner, the sensing marks 21 for the succeeding numerals or digits of the account number 12 find their places in the succeeding transverse columns in the area 20 and in the predetermined transverse location for the particular numeral value thereof. A sensing mark 21 is thus provided for each numeral or digit of the account number 12 in accordance with its order in the account number and the numeral value thereof. The sensing marks 21 thus formed are easily read when noted from left to right in Fig. 1, whereupon it will be seen that the order and value of said sensing marks 21 are identical to the order and value of the respective numerals or digits of said account number 12.

The tabulating card T also includes a lower area 30 on which groups of other similar sensing marks 31*a* to 31*d*, inclusive, are printed in conjunction with the printed characters 11, 12 and 25 and the sensing marks 21. These groups of sensing marks 31*a* to 31*d*, inclusive, are of the same character as the sensing marks 21 and are provided in the same manner and relation on the card area 30 according to the same general code or table based on the order and value of the digits in the numbers they represent. As shown, said groups of sensing marks 31*a* to 31*d*, inclusive, are selectively provided on the card in accordance with the numeral values of the amount of the check, the bank number, the drawer's bank account number and the date of the check. Also provided with such selectively arranged sensing marks 31*a* to 31*d*, inclusive, are conventional numerals printed, written or otherwise provided on the tabulating card T on the side portion 37, for example, which indicate exactly the values of the numbers represented by said sensing marks 31*a* to 31*d* inclusive. Thus, it will be seen that in the side area *a* indicating the amount of the check, the amount number $375.92 is represented and indicated by the group of sensing marks 31*a* in the same order and of the same value as the respective digits of said amount number; likewise, the bank number in the side area *b* is represented and indicated by the group of sensing marks 31*b*; similarly the drawer's bank account number in the side area *c* is represented and indicated by the group of sensing marks 31*c*; and, the date of the check in the area *d* is represented and indicated by the group of sensing marks 31*d*.

In a similar manner, any other area of the card may be provided with sensing marks representing a number indicating a detail of the check or other document. In the area 40, for example, the number of the check is represented and indicated by the similar selectively located group of sensing marks 41. It will be appreciated that the provision of the group of sensing marks 31*a* representing the bank number adapt such a tabulating card type of check shown for use in card sorting and tabulating machines in a bank clearing house and in the bank on which the check is drawn as well as in the accounting office of the company drawing the check. For further bank accounting purposes, such a tabulating card is readily prepared in the form of a deposit slip in which the constant or source data regarding the depositor is provided in the area 10 and the area 30 provided with similar sensing marks such as 31*a* representing the amount of the deposit, and sensing marks 31*d* indicating the date of the deposit, together with a group of similar sensing marks for the depositor's bank account number and likewise, for any other necessary or desirable detail regarding the deposit.

In the present example, the bank number, the drawer's bank account number and the number of the check are all predetermined known data and accordingly, the groups of sensing marks 31*b*, 31*c* and 41, respectively, for these data may be preformed on tabulating cards prepared in quantity ready for use so as to provide considerable savings in the time and cost for completing such checks at the time they are prepared to be issued.

In accordance with the present invention, such preformed sensing marks 31*b*, 31*c* and 41 are provided on the tabulating cards in a permanent indelible form in which the graphite substance of the sensing marks is not subject to smudging or smearing that might result in inaccurate sensing operations, as aforesaid.

Figure 2:
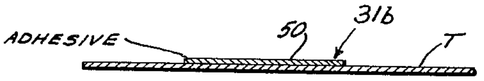
Figs. 2, 3 and 4 are fragmentary sectional views of a card or sheet, as along line 4—4 of Fig. 1 on an enlarged exaggerated scale, and illustrate the successive steps in the method for providing the sensing marks in accordance with the invention, Fig. 2 showing the initial step in which an image or replica of the mark in adhesive is provided on the record card or sheet.

As illustrated in Fig. 2, the initial step in providing the sensing marks to be preformed on the tabulating card T involves the provision of images or replicas of said sensing marks in a coating or layer of adhesive 50. The adhesive may be applied in any suitable way as in the manner of a printing operation or by the use of a stencil and the adhesive sprayed or brushed onto the card through such stencil in the shape and size of the sensing marks to be provided. Preferably an adhesive is employed which will not cause any chemical change reducing the conductivity of the graphite substance of the sensing marks and, to this end, the use of a fine varnish as the adhesive 50 has been found highly satisfactory.

Figure 3:
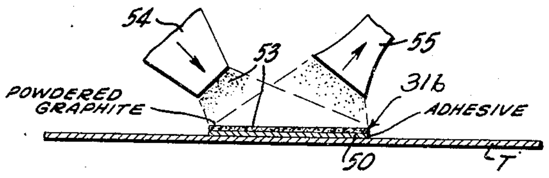
Figure 4:
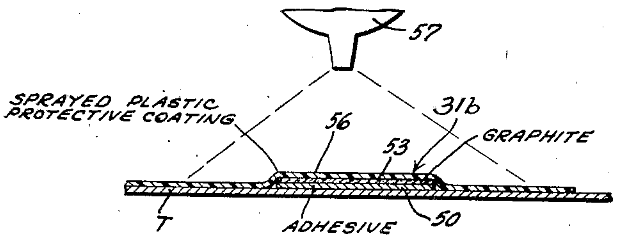

As seen in Fig. 3, following the application of the varnish 50 or other adhesive, there is applied the graphite 53 or other conductive material. Preferably, this is effected by a coating or layer of graphite 53 provided by powdered substantially pure graphite blown onto the previously applied adhesive 50 by a suitable blower 54 and the excess graphite removed by a suitable suction means 55. In this way, a major portion of the coating or layer of powdered graphite 53 adheres to the base layer of varnish 50 in substantially its pure state so that the sensing mark is capable of maximum electrical conductivity. In this condition, the sensing marks are admirably suited for accurate and reliable sensing operations, and, tabulating cards thus provided with sensing marks may be so used. However, in order to guard against any possible smudging or smearing of the graphite material 53 of the sensing marks in the stacking, handling and repeated use of the tabulating cards, it is preferable to supply the sensing marks with a protective coating 56 as shown in Fig. 4. This coating 56 is continuous but sufficiently thin so as to permit conductivity between the marks 53 and the electrical contacts which engage said marks.

Such a protective coating 56 is provided by a plastic liquid, such as is disclosed in Patent Number 1,945,998, dated February 6, 1934, and which is applied in a fine mist onto the graphite layers 53 of the sensing marks, as by a suitable spraying means 57, Fig. 4. This sprayed-on plastic film 56 is then allowed to dry and the resultant plastic layer or coating 56 forms a hard, water insoluble and heat resistant shell over the graphite material 53 which confines said graphite material 53 to the exact intended outline of the sensing marks and otherwise protects said sensing marks against any smearing or smudging that might possibly result in inaccurate sensing operations. It has been found that such sprayed plastic protective coating 56 causes little or no increase in resistance in the electrical conductivity of the graphite 53 of the sensing marks thus provided and that the sensing marks otherwise have substantially the same uniform conductivity through such protective coating 56.

It will be appreciated that the method of providing the sensing marks on an adhesive base 50 produces the marks in a sharp and precise form which also insures accurate and reliable sensing operations wherever intended. The plastic protective coating 56 may be applied only to the areas of the preformed sensing marks 31*b*, 31*c* and 41, or, to the entire area of the record card or sheet as desired. In the latter instance, the sprayed-on coating 56 does not affect the subsequent provision of the other sensing marks 21, 31*a*, and 31*d* for the variable details of the transaction inasmuch as these other sensing marks preferably are also provided in the same general method described wherein an adhesive layer or coating of varnish 50 serves as an excellent base which readily adheres to such previously applied plastic protective coating 56.

While the invention has been described with a specific example, such example is intended as an illustration only inasmuch as it will be apparent that various modifications and deviations may be resorted to without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. An article comprising a sheet of material and marks located upon the surface of said sheet in position to be engaged by correspondingly located electrical contacts, said marks comprising a layer of conducting material adapted to form part of a current path between said contacts, and a protective coating over said layer of conducting material, said coating being continuous but sufficiently thin so as to permit conductivity between the marks and said electrical contacts.

2. An article comprising a sheet of material and marks located upon the surface of said sheet in position to be engaged by correspondingly located electrical contacts, said marks comprising a layer of adhesive and a layer of conducting material united to said adhesive and adapted to form part of a current path between said contacts, and a protective coating over said layer of conducting material, said coating being continuous but sufficiently thin so as to permit conductivity between the marks and said electrical contacts.

3. An article comprising a sheet of material and marks located upon the surface of said sheet in position to be engaged by correspondingly located electrical contacts, said marks comprising a layer of adhesive and a layer of powdered graphite united to said adhesive and adapted to form part of a current path between said contacts, and a protective coating over said layer of powdered graphite, said coating being continuous but sufficiently thin so as to permit conductivity between the marks and said electrical contacts.

4. An article comprising a sheet of material and indelible marks located upon the surface of said sheet in position to be engaged by correspondingly located electrical contacts, said marks comprising a layer of graphite material adapted to form part of a current path between said contacts, and a plastic protective coating over said layer of graphite material, said coating being continuous but sufficiently thin so as to permit conductivity between the marks and said electrical contacts.

5. The method of producing an electrically conductive mark upon a record card or sheet which comprises, providing an image of the mark in a layer of adhesive on the card or sheet, applying electrically conductive material to said adhesive, and providing a protective coating over said electrically conductive material.

6. The method of producing an electrically conductive mark upon a record card or sheet which comprises, providing an image of the mark in a layer of adhesive on the card or sheet, applying powdered graphite to said adhesive to form an electrically conductive layer, and providing a protective coating over said electrically conductive layer of graphite.

7. The method of producing an electrically conductive mark upon a record card or sheet which comprises, providing an image of the mark in a layer of adhesive on the card or sheet, applying powdered graphite to said adhesive to form an electrically conductive layer, and spraying liquid plastic on said electrically conductive layer to form a protective coating thereon.

8. The method of producing an indelible electrically conductive mark upon a record card or sheet which comprises, providing said mark on the card or sheet in a layer of electrically conductive material, and spraying liquid plastic on said electrically conductive layer to form a protective coating thereon.

9. The method of producing an indelible electrically conductive mark upon a record card or sheet which comprises, providing said mark in a layer of graphite on the card or sheet, and spraying liquid plastic on said graphite layer to form a protective coating thereon.

WILLIAM H. WOLOWITZ.

REFERENCES CITED

The following references are of record in the file of this patent:

UNITED STATES PATENTS

| Number | Name | Date |
|---|---|---|
| 128,148 | Hutchings | June 18, 1872 |
| 2,158,749 | Elliott | May 16, 1939 |
| 2,294,681 | Moon | Sept. 1, 1942 |
| 2,484,642 | Paris | Oct. 11, 1949 |
| 2,493,848 | Ayres | Jan. 10, 1950 |
| 2,508,953 | Knutsen | May 23, 1950 |
| 2,547,838 | Russell | Apr. 3, 1951 |